United States Patent
He et al.

(10) Patent No.: US 11,917,030 B2
(45) Date of Patent: Feb. 27, 2024

(54) PUSH NOTIFICATION DISTRIBUTION SYSTEM

(71) Applicant: Apple Inc., Cupertino, CA (US)

(72) Inventors: Huan He, Cupertino, CA (US); Jonathon Sodos, Los Gatos, CA (US); Nicholas J. Circosta, Mountain View, CA (US); Sean Geiger, San Francisco, CA (US); Nelson M. Leduc, San Jose, CA (US); Cisto Cyriac, Cupertino, CA (US); Matthew E. Shepherd, Mountain View, CA (US); David A. Schaefgen, San Jose, CA (US); Elliot T. Garner, Cupertino, CA (US); Jose A. Lozano Hinojosa, Sunnyvale, CA (US); Mursalin Akon, San Jose, CA (US); Robert D. Butler, Middletown, DE (US); Xudong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/214,774

(22) Filed: Mar. 26, 2021

(65) Prior Publication Data
US 2021/0392194 A1 Dec. 16, 2021

Related U.S. Application Data

(60) Provisional application No. 63/039,930, filed on Jun. 16, 2020.

(51) Int. Cl.
*H04L 67/55* (2022.01)
*H04L 67/53* (2022.01)
*H04L 67/50* (2022.01)

(52) U.S. Cl.
CPC .............. *H04L 67/55* (2022.05); *H04L 67/53* (2022.05); *H04L 67/535* (2022.05)

(58) Field of Classification Search
None
See application file for complete search history.

(56) References Cited

U.S. PATENT DOCUMENTS

| | | | |
|---|---|---|---|
| 11,093,306 B1 * | 8/2021 | Libin | H04L 67/54 |
| 2013/0084896 A1 * | 4/2013 | Barkie | H04W 12/033 |
| | | | 455/466 |
| 2014/0362768 A1 * | 12/2014 | Wood | H04W 52/0258 |
| | | | 370/328 |
| 2014/0364104 A1 * | 12/2014 | Wood | H04W 4/50 |
| | | | 455/418 |

(Continued)

*Primary Examiner* — Chris Parry
*Assistant Examiner* — Abderrahmen Chouat
(74) *Attorney, Agent, or Firm* — BAKERHOSTETLER (57) ABSTRACT

A push notification distribution system centralizes the management and delivery of push notifications to applications executing on electronic devices. Registration requests to register applications for push notifications may be aggregated and sent as an aggregated registration request. The delivery priority of push notifications may be managed according to specified preferences. Upon receiving a push notification intended for an electronic device, a delivery priority of the push notification may be changed if an application identifier associated with the push notification is found on a list of application identifiers with designed delivery priorities.

27 Claims, 6 Drawing Sheets

(56) References Cited

U.S. PATENT DOCUMENTS

| | | | | |
|---|---|---|---|---|
| 2015/0026356 | A1* | 1/2015 | Kaplinger | H04L 67/55 709/230 |
| 2015/0081817 | A1* | 3/2015 | Jeon | H04L 67/55 709/206 |
| 2016/0112525 | A1* | 4/2016 | Kawato | H04L 12/1859 709/203 |
| 2017/0104835 | A1* | 4/2017 | Goel | H04L 51/58 |
| 2020/0387411 | A1* | 12/2020 | Chu | G06F 16/5866 |
| 2021/0195002 | A1* | 6/2021 | Yamamoto | H04L 67/55 |
| 2021/0311783 | A1* | 10/2021 | Lee | G06F 9/4881 |
| 2021/0337039 | A1* | 10/2021 | Dukellis | H04L 67/61 |

* cited by examiner

PUSH NOTIFICATION DISTRIBUTION SYSTEM

CROSS REFERENCE TO RELATED APPLICATIONS

This application claims the benefit of priority to U.S. Provisional Patent Application No. 63/039,930, entitled "PUSH NOTIFICATION DISTRIBUTION SYSTEM," filed on Jun. 16, 2020, the disclosure of which is hereby incorporated herein in its entirety.

TECHNICAL FIELD

The present description generally relates to network communications and more particularly to management of push notifications.

BACKGROUND

Push notifications may be used to notify applications of updates available with respect to the applications. Prior to receiving a push notification, an electronic device on which an application is being executed may be registered to receive push notifications associated with the application. As the number of the applications being executed on the electronic device increases, the burden of maintaining the registrations to receive push notifications for the applications on the electronic device also increases. In addition, the frequency of push notifications being delivered to the electronic device can be detrimental to the performance of the electronic device.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Application developers may use push notifications to notify instances of the application being executed on electronic devices of updates to the application. For example, a push notification may notify an application of new activity in a feed of a social media application or arrival of a new message in a messaging application. A push notification also may notify an application about new code or data for the application that is available to download and install on the electronic device. Push notifications may be visible notifications where the application provides some visual and/or audio indicator of the arrival of the push notification. Push notifications also may be background notifications, which may be processed by an application (e.g., a receiving application for which the push notifications correspond) in the background to update the application and/or preload content without informing or interrupting a user of the electronic device until the user has activated the application for use (e.g., opened the application).

An electronic device may register multiple topics (e.g., applications, services) for which push notifications are desired. For example, each application may send a registration request that may include an identifier of the application, an identifier of a user account for accessing the application, and a token or device identifier of the electronic device. The registration request may be processed to update a registry used to identify user accounts and electronic devices to which push notifications for an associated application should be delivered. Periodically, registrations requests may be resent by the applications to renew the associated entries in the registry. When multiple applications are being executed on an electronic device, the number of initial registration requests and renewal registration requests can occupy a significant portion of the communication bandwidth available to the electronic device and can degrade performance of the applications experienced by a user.

The subject technology provides a centralized push notification distribution system for managing push notification registrations. According to aspects of the subject technology, a push distribution client executing on an electronic device receives registration requests for push notifications from applications executing on the electronic device. The push distribution client aggregates the received registration requests into an aggregated registration request and sends the aggregated registration request to a push distribution server to register the electronic device to receive push notifications associated with the applications. The push distribution server maintains a centralized registry containing application identifiers for the registered applications, user identifiers for the user accounts associated with the applications, and device identifiers for the electronic devices on which the applications are installed and executed. When a developer or application server desires to send a push notification to an application associated with a user account, the push notification is sent to the push distribution server which references the registry to identify electronic devices associated with the user account on which the application is installed. The push distribution server then delivers the push notification to the identified electronic device(s) for the application installed thereon. For example, in some embodiments, a user account is associated with multiple electronic devices and the push notification is sent to each of the multiple electronic devices based on the multiple electronic devices being associated with the user account.

In an exemplary method, at a first electronic device, a first registration request may be received from a first application, wherein the first application is executing on the first electronic device, and a second registration request may be received from a second application, wherein the second application is executing on the first electronic device, and wherein the second application is different from the first application. In accordance with a determination that one or more first criteria are met, an aggregated registration request may be generated, based on the first registration request and the second registration request. The aggregated registration request may be sent to a second electronic device separate from the first electronic device to register the first electronic device to receive (1) push notifications associated with the first application and (2) push notifications associated with the second application. After sending the aggregated registration request, a first push notification associated with the first application may be received, and a second push notification associated with the second application may be received, wherein the second push notification is different from the first push notification. After sending the aggregated registration request, a message confirming registration of the first electronic device to receive push notifications associated with the first application may be received.

The one or more first criteria may include a criterion that is met when the first electronic device has logged into a user account on a third electronic device within a predetermined period of time prior to receiving the first registration request or the second registration request. In accordance with a determination that the one or more first criteria are not met, the first registration request may be sent to the second electronic device separate from sending the second registration request to the second electronic device.

The aggregated registration request may be generated and sent to the second electronic device in accordance with a determination that one or more second criteria are met. The one or more second criteria may include a criterion that is met after a predetermined time period has lapsed following receipt of a most recently received one of the first registration request and the second registration request. The aggregated registration request may be generated and sent to the second electronic device in accordance with a determination that one or more third criteria are met. The one or more third criteria may include a criterion that is met after a predetermined time period has lapsed following receipt of an earliest received one of the first registration request and the second registration request.

The aggregated registration request may include a first application identifier corresponding to the first application, and a second application identifier corresponding to the second application, wherein the second application identifier is different from the first application identifier. The aggregated registration request may further include a first user identifier corresponding to a first user account of the first application, and a second user identifier corresponding to a second user account of the second application, wherein the second user account is different from the first user account. The aggregated registration request may further include a device identifier corresponding to the first electronic device.

A third registration request may be received from a third application, wherein the third application is executing on the first electronic device, and wherein the third application is different from each of the first application and the second application. In accordance with a determination that one or more fourth criteria are met, the third registration request to register the first electronic device to receive push notifications associated with the third application may be sent to the second electronic device. The one or more fourth criteria may include a criterion that is met when a list includes an identification of an application associated with a registration request, and wherein the list includes an identification of the third application. In accordance with the determination that the one or more fourth criteria are met, the third registration request may be aggregated with the first registration request and the second registration request in the aggregated registration request, and the aggregated registration request may be sent to the second electronic device in accordance with the determination that the one or more fourth criteria are met.

The centralized push notification distribution system of the subject technology may reduce network communications made by an electronic device by aggregating registration requests made by applications executing on the electronic device rather than each application sending its own registration request over the network. With the number of registration requests being sent over the network reduced, the available network bandwidth may be used for messaging to confirm receipt and processing of the aggregated registration request and thereby improve the reliability of registrations for push notifications. In addition, by centrally maintaining a registry for electronic devices and the associated user accounts and applications, developers and application servers can reduce the management overhead as they only need to keep track of user accounts for pushing notifications to their respective applications and not all of the electronic devices associated with a particular user account. The push notification distribution system can fan out push notifications across multiple devices having the application installed thereon using the centralized registry to identify the electronic devices associated with the particular user account. Other functionality and advantages of the subject technology will become apparent based on the description below.

The timing for delivering a push notification to an application on an electronic device may vary based on a delivery priority assigned to the push notification. For example, a push notification assigned a first priority may be delivered as soon as possible to an application on the electronic device. Visible push notifications may be assigned this first priority when a developer of the application believes that the timing of the information or update associated with the push notification is important to the user or the developer. Alternatively, a push notification assigned a second priority may be delivered to the application on the electronic device upon the determination of a predetermined condition or timing such as when the electronic device is determined to be in an active state. Background push notifications may be assigned this second priority when the developer of the application does not believe that the timing of the information or update associated with the push notification is important to the user or the developer.

The delivery of push notifications may impact the performance of an electronic device. For example, if the electronic device is in an inactive or idle state, receipt of a push notification may cause the electronic device to wake up into an active state. Returning to an active state may involve turning a display device on, moving processors and/or memory out of an idle state into an operating state, and/or other operations that involve an increase in the power consumed by the electronic device. For electronic devices operating on battery power, each push notification represents a possible battery hit that may shorten the period of time the electronic device can operate before recharging the battery or supplying another power source to the electronic device.

A delivery priority may be indicated in the header of a payload of a push notification sent by a developer or application server. The subject technology provides a system in which a user can designate a delivery priority for push notifications intended for an application on an electronic device when the electronic device is registered for push notifications with the push distribution server. The push distribution server may maintain priority lists for different delivery priorities, where each list includes application identifiers of the applications whose push notifications have been designated a delivery priority associated with the list. Upon receiving a push notification intended for an electronic device, the push distribution server may compare an application identifier from the push notification against application identifiers on the respective lists. If the application identifier is found on a priority list, the push distribution server may change the delivery priority for the push notification to the priority associated with the priority list and deliver the push notification to the electronic device according to the changed priority.

For example, a push notification intended for an electronic device may be received from a server and it is determined whether an application identifier of the push notification exists on a priority list containing application identifiers with designated push notification priorities. In response to determining that the application identifier exists on the priority list, changing a delivery priority of the push notification from a first priority to a second priority and delivering the push notification to the electronic device according to the second priority.

A registration request including a first registration request specific to an application installed on the electronic device and a designated delivery priority may be received from an electronic device. The electronic device may be registered to receive push notifications from the server based on the registration request. In addition, the application identifier from the registration request may be added to a priority list based on the designated delivery priority.

The push notification may be delivered to the electronic device according to the second priority based on the electronic device being determined to be in the active state. The electronic device may be determined to be in an active state upon determining whether a predetermined period of time has lapsed following receiving a communication from the electronic device. The electronic device may be determined to be in an active state based on a period of time indicated by the electronic device.

In response to determining that the application identifier does not exist on the priority list, the push notification may be delivered to the electronic device according to the first priority. The first priority may be indicated in the push notification received from the server. The push notification may be delivered to the electronic device according to the first priority without determining a state of the electronic device. The delivery of the push notification to the electronic device may cause the electronic device to transition from an inactive state to an active state. The push notification may include a visible notification for display on the electronic device or a background notification for a background process executed on the electronic device.

It may be determined whether the application identifier of the push notification exists on another priority list and, in response to determining that the application identifier exists on the other priority list, the delivery priority of the push notification may be changed from the first priority to a third priority and the push notification may be delivered to the electronic device according to the third priority. A timing of delivering the push notification to the electronic device according to the third priority is different from a timing of delivery for the first priority and a timing of delivery for the second priority.

The push notification distribution system of the subject technology allows a user to override the priority of push notification delivery designated by a developer according to the user's preferences. In this manner, the user is able to limit the ability of specified applications to wake an electronic device from an inactive state by sending a push notification to the electronic device. Accordingly, the user may be able to obtain longer battery life when the electronic device is operating on battery power. Other functionality and advantages of the subject technology will become apparent based on the description below.

Figure 1:
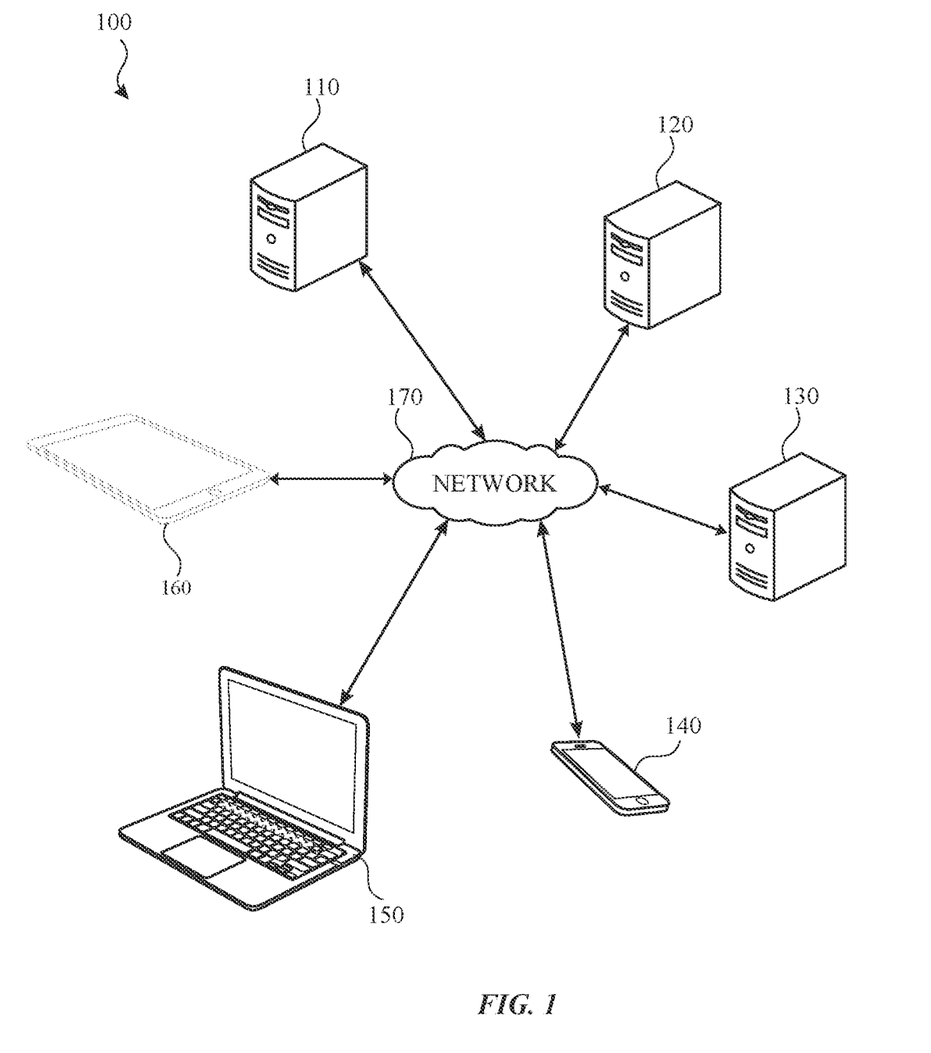
FIG. 1 illustrates an example network environment according to aspects of the subject technology.

FIG. 1 illustrates an example network environment 100 according to aspects of the subject technology. Not all of the depicted components may be used in all implementations, however, and one or more implementations may include additional or different components than those shown in the figure. Variations in the arrangement and type of the components may be made without departing from the scope of the claims as set forth herein. Additional components, different components, or fewer components may be provided.

The network environment 100 is depicted with a number of electronic devices including server 110, server 120, server 130, electronic device 140, electronic device 150, and electronic device 160. Network 170 may communicatively (directly or indirectly) couple servers 110, 120, and 130 together with electronic devices 140, 150, and 160. Network 170 is not limited to any particular type of network, network topology, or network media. Network 170 may be a local area network or a wide area network. Network 170 may be an interconnected network of devices that may include, or may be communicatively coupled to, the Internet. For explanatory purposes, the network environment 100 is illustrated in FIG. 1 as including three servers and three electronic devices. However, the network environment 100 may include any number of electronic devices and any number of servers.

Electronic device 140 is depicted as a smartphone, electronic device 150 is depicted as a laptop computer, and electronic device 160 is depicted as a tablet. The subject technology is not limited to these embodiments of electronic devices and may include other types of electronic devices having the push distribution client installed to manage registration requests made from applications installed on the electronic devices according to the processes described herein. Electronic devices 140, 150, and 160 may include all or part of the components of the system described below with respect to FIG. 6.

Server 110 may implement a push distribution server to manage the registration of applications for push notifications and the delivery priorities assigned to push notifications according to the processes described herein. Servers 110, 120, and/or 130 also may implement application servers to support applications installed on electronic devices. The application servers may authenticate user accounts for access to associated applications, sync data between the application server and the applications or between different instances of the applications on different electronic devices, store or backup user data from the applications, and/or send push notifications to the applications for updates to the applications. Servers 110, 120, and/or 130 may implement application service platforms which may centralize user account authentication for multiple applications, provide cloud storage for the applications, sync states and data between different instances of an application, and/or manage the distribution of push notifications to the electronic devices. Servers 110, 120, and 130 may represent distinct machines or groups of machines co-located at a single location or distributed across multiple locations. Servers 110, 120, and/or 130 may be virtual servers operating on the same set of hardware. Servers 110, 120, and/or 130 are depicted as being separate from electronic devices 140, 150, and 160. The servers may be located remote from the electronic devices or may be coupled directly to the electronic devices. Servers 110, 120, and 130 may include all or part of the components of the system described below with respect to FIG. 6.

Figure 2:
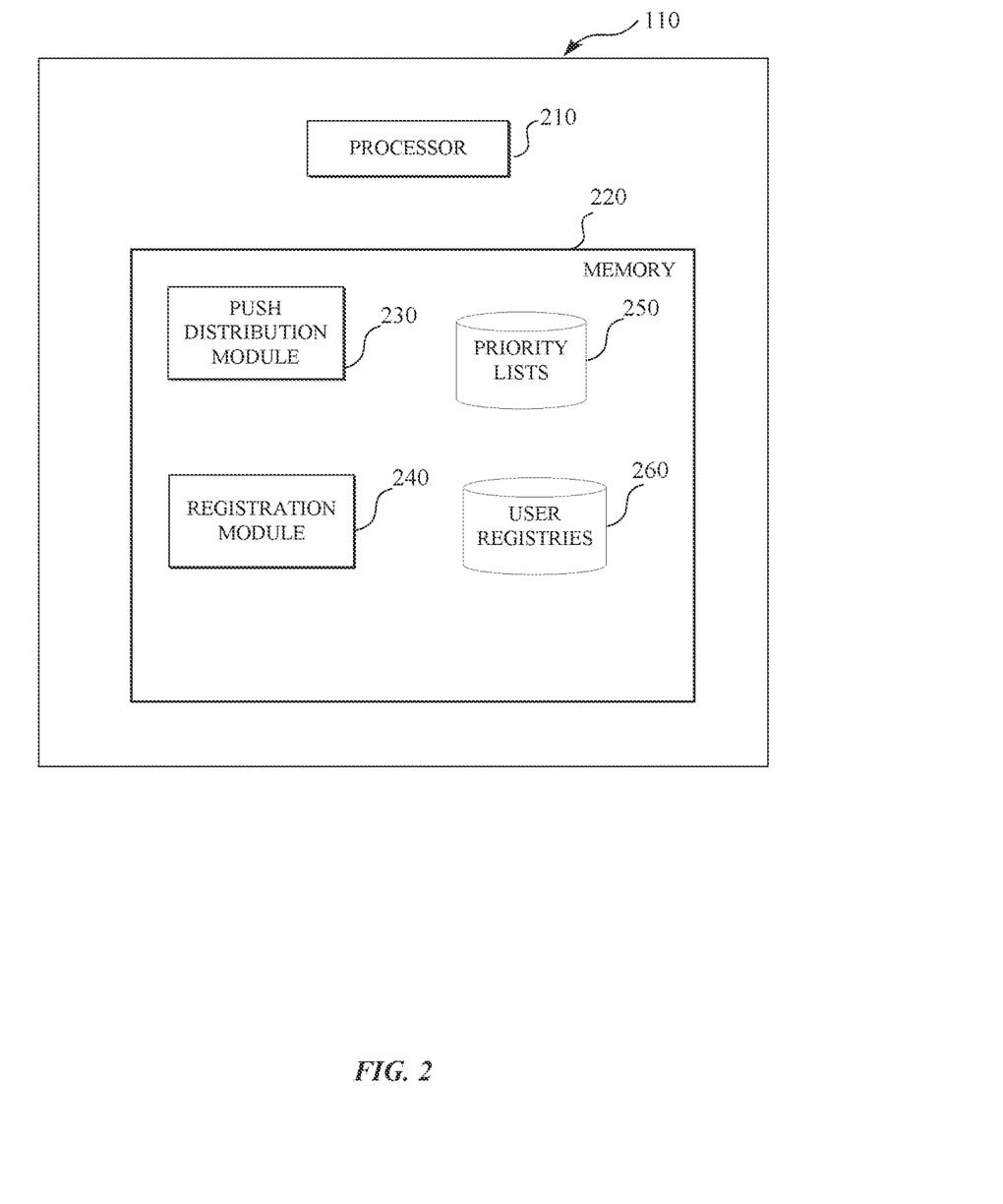
FIG. 2 is a block diagram illustrating components of a server used to implement a push distribution server according to aspects of the subject technology.

FIG. 2 is a block diagram illustrating components of server 110 used to implement a push distribution server according to aspects of the subject technology. While the components are being described as being part of server 110, some or all of the components may be implemented on other systems such as servers 120 or 130, or on electronic devices 140, 150, or 160. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, server 110 includes processor 210 and memory 220. Examples of processor 210 and memory 220 are provided below in connection with FIG. 6. Memory 220 may contain push distribution module 230, registration module 240, priority lists 250, and user registries 260. Push distribution module 230 represents code comprising one or more sequences of instructions executable by processor 210 to perform the push notification management processes described herein. Registration module 240 represents code comprising one or more sequences of instructions executable by processor 210 to implement the processes for registering applications and electronic devices for push notifications described herein. Priority lists 250 represent data structures used to organize lists of application identifiers associated with designed delivery priorities as described herein. User registries 260 represent data structures used to organize the registration of application and electronic devices for distribution of push notifications as described herein. Priority lists 250 and user registries 260 are not limited to any particular types of data structures.

Figure 3:
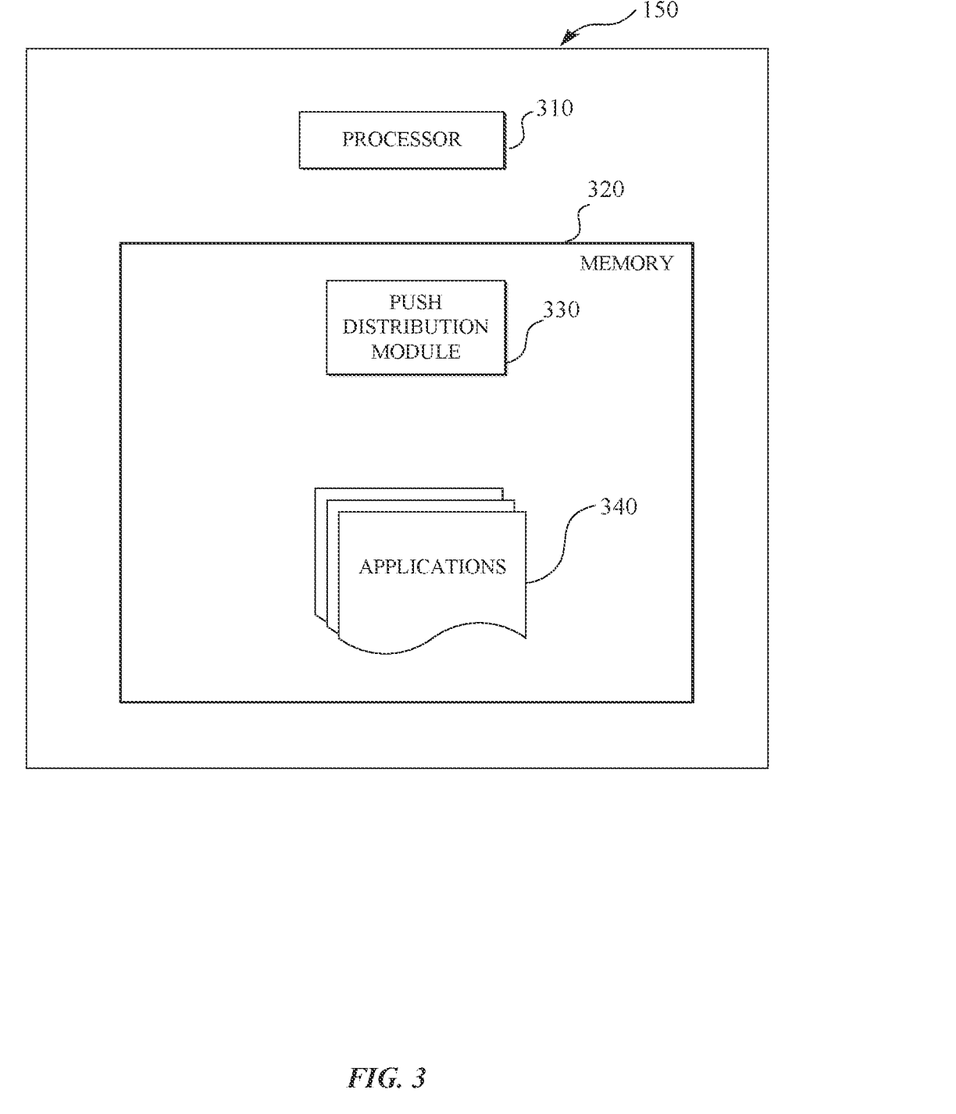
FIG. 3 is a block diagram illustrating components of an electronic device used to implement a push distribution client according to aspects of the subject technology.

FIG. 3 is a block diagram illustrating components of electronic device 150 used to implement a push distribution client according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, electronic device 150 includes processor 310 and memory 320. Examples of processor 310 and memory 320 are provided below in connection with FIG. 6. Memory 320 may contain push distribution module 330 and applications 340. Push distribution module 330 represents code comprising one or more sequences of instructions executable by processor 310 to implement a push distribution client to perform the aggregation and delivery of registration requests made by applications 340 as described herein. In some embodiments, the push distribution client also may deliver push notifications received by electronic device 150 to the intended application of applications 340. Applications 340 represent code comprising one or more sequences of instructions executable by processor 310 to implement applications such as messaging applications, social network applications, calendaring applications, and other types of applications that may receive push notifications from application servers.

Figure 4:
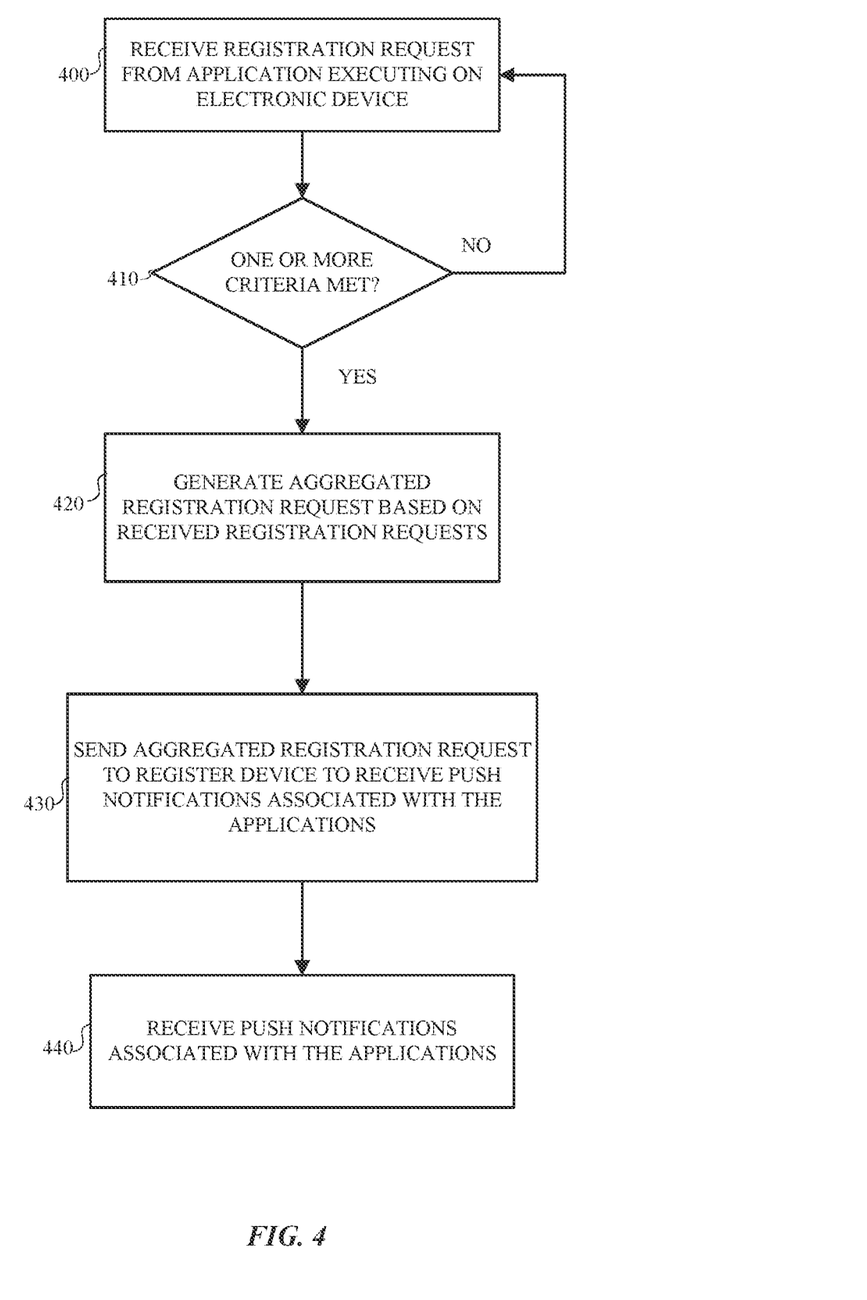
FIG. 4 is a flowchart illustrating a process for aggregating registration requests from applications for receiving push notifications according to aspects of the subject technology.

FIG. 4 is a flowchart illustrating a process for aggregating registration requests from applications for receiving push notifications according to aspects of the subject technology. For explanatory purposes, the blocks of the process are described herein as occurring in serial, or linearly. However, multiple blocks of the process may occur in parallel. In addition, the blocks of the process need not be performed in the order shown and/or one or more blocks of the process need not be performed and/or can be replaced by other operations.

Prior to receiving push notifications from an application server, applications on an electronic device may be registered to receive the push notifications. Different instances of the applications installed on different electronic devices each register to receive the push notifications. According to aspects of the subject technology, a push distribution client executing on an electronic device provides an interface to receive registration requests from applications executing on the electronic device (block 400). Before sending a registration request from an application (e.g., upon receiving the registration request), the push distribution client may determine whether one or more criteria are met (block 410).

According to aspects of the subject technology, the criteria represent conditions to control the timing of aggregating registration requests and sending the aggregated registration requests to the push distribution server for registration of the applications on the electronic device for push notifications. While aggregating registration requests may reduce the number of registration request messages sent to the push distribution server, a period of time may be defined after which the registration requests received during the period of time are aggregated to be sent to the push distribution server. For example, a delay timer may be set for a predetermined period of time upon receipt of a first registration request since the electronic device was turned on/awakened or since the last aggregated registration request was sent to the push distribution server. The delay timer may be reset every time another registration request is received from an application, thereby allowing the total period of time to be extended. Alternatively, the delay timer may be allowed to run through the receipt of subsequent registration requests, thereby limiting the amount of time a registration request must wait before being sent on to the push distribution server. Lapsing of the delay timer may represent one or more criteria being met.

If none of the criteria are determined to have been met (block 410), the received registration request is queued in memory and the process returns to wait for a subsequent registration request (block 400). The process may continue to monitor the criteria while waiting for a subsequent registration request to be received from an application executing on the electronic device. After a subsequent registration request is received, if one or more criteria have been met (block 410), the process proceeds to aggregate the received registration requests to generate an aggregated registration request (block 420).

A registration request received from an application executing on the electronic device includes information for registering the application at a push distribution server to receive push notifications at the electronic device. The information may include an application identifier uniquely identifying the application making the registration request. The application identifier may be hashed. The information also may include a user identifier for the user account used to access the application. The user account credentials may be used as the user identifier, or some other unique representation associated with the user credentials may be used to preserve security of the user credentials. The information also may include a token or device identifier uniquely identifying the electronic device on which the application is being executed.

Aggregating the received registration requests may include creating a data structure containing the information outlined above to be sent to the push distribution server to register the applications to receive push notifications. The data structure may include tuples of the outlined information for each registration request. As all of the applications are being executed on the same electronic device, the token or device identifier may not be included in each tuple and may instead be provided in another section of the aggregated registration request. Similarly, if an application service platform is being used for centralized user account authentication, the same user credentials may be used to access the applications. In this situation, the user identifier may not be included in each tuple and may instead be provided in another section of the aggregated registration request.

Once the aggregated registration has been generated (block 420), the aggregated registration request may be sent to the push distribution server to register the electronic device to receive push notifications associated with the applications identified in the registration requests (block 430). The registration module being executed on the push distribution server may process the aggregated registration request to register the applications in user registries. The user registries maintain lists of user identifiers associated with applications and the device identifiers for the electronic devices on which the applications are being executed. For example, a single registry may be maintained for all electronic devices on which a particular application is being executed for a particular user account. In this manner, an application server can send a push notification to all instances of an application for a particular user account using the user identifier when sending the push notification to the push distribution server. In some embodiments, this simplifies the push notification management required by application servers as the application servers do not need to keep track of all of the electronic devices on which their applications are installed for different user accounts, and may only track the user accounts themselves. In some embodiments, this adds a layer of privacy for users as the application servers are not aware of what or how many electronic devices that a particular user account is associated with.

When registration requests are sent individually rather than being aggregated, the push distribution server may not acknowledge receipt of the registration requests or confirm that the registrations have been completed to reduce network traffic. With a reduction in network messaging using the aggregated registration requests, the push distribution server may send an acknowledgment back to the electronic device upon receiving the aggregated registration request. The push distribution server also may send a confirmation back to the electronic device when the user registries have been updated based on the registration requests included in the aggregated registration request. Accordingly, the subject technology improves the reliability of requesting registration for push notifications. This improved reliability allows the heartbeat or renewal period of an application's registration request to be longer than if no acknowledgment or confirmation were sent back by the push distribution server. This improvement further reduces network traffic and messaging operations required of the electronic device.

Subsequent to the registration of the applications for push notifications, the electronic device may receive push notifications associated with the applications from the push distribution server or directly from an application server (block 440). The push distribution server may notify the application server associated with an application that has registered for push notification upon registering the application to ensure the application server is aware of the application being accessed under the user account in order to provide push notifications to the application. The push notifications may be received by the push distribution client and distributed to the associated applications or may be received by the associated application bypassing the push distribution client.

The criteria noted above for proceeding with the aggregation of received registration requests were related to timing relative to receipt of a registration request. Other criteria may be reviewed for controlling the aggregation process according to aspects of the subject technology. For example, a daemon/service may listen for when an application service platform is logged into for accessing applications managed by the platform. The aggregation processes described herein may be enabled for a period of time following the login completion determined by the daemon/service. Once the period of time has lapsed, registration requests received from applications may be sent individually to the push distribution server as they are received rather than waiting to aggregate multiple registration requests.

Another criteria may involve the use of whitelists identifying applications for which aggregation is bypassed. Upon receipt of an registration request, the push distribution client may check a whitelist to see if the application from which the registration request was received is on the whitelist. If the application is identified on the whitelist, the registration request is sent to the push distribution server without further delay. The registration request may be sent individually or the registration request may be aggregated with any other registration requests that have been received and are awaiting aggregation at that time.

Parameters associated with the criteria and other aspects of the aggregation process performed by the push distribution client may be controlled and set by the push distribution server. For example, the push distribution server may provide the parameters or changes to the parameters in messages exchanged with the push distribution client executing on the electronic devices.

Figure 5:
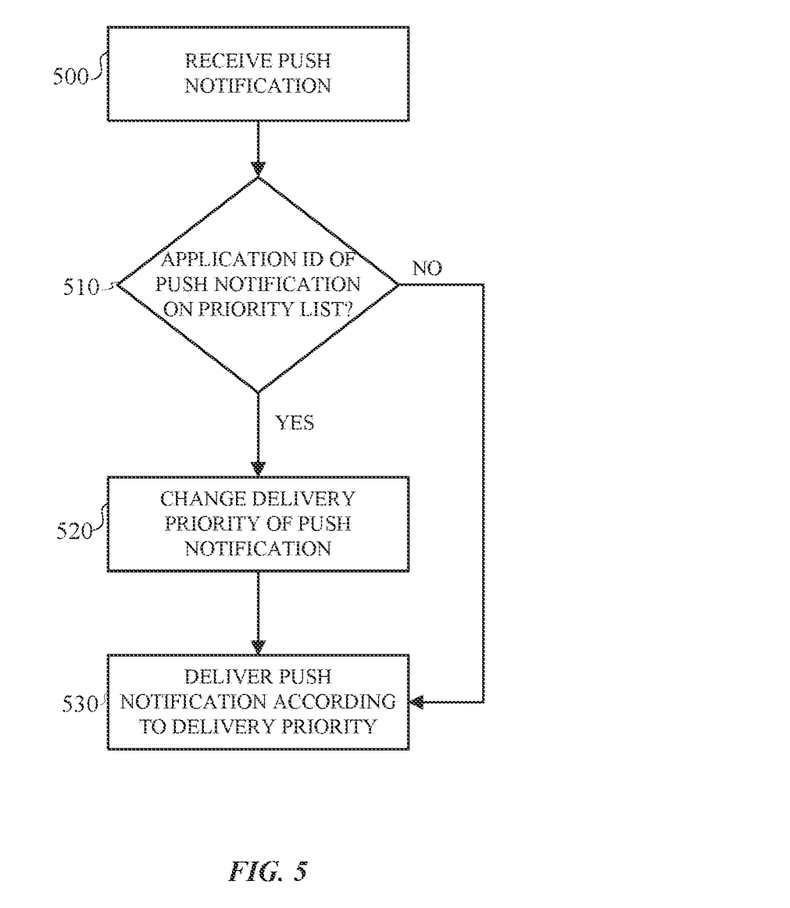
FIG. 5 is a flowchart illustrating a process for managing delivery priority for push notifications according to aspects of the subject technology.

FIG. 5 is a flowchart illustrating a process for managing delivery priority for push notifications according to aspects of the subject technology. For explanatory purposes, the blocks of the process are described herein as occurring in serial, or linearly. However, multiple blocks of the process may occur in parallel. In addition, the blocks of the process need not be performed in the order shown and/or one or more blocks of the process need not be performed and/or can be replaced by other operations.

As noted above, push notifications may have different delivery priorities controlling the timing of delivering the push notifications to applications on electronic devices. A developer or application server may designate a delivery priority in the push notification itself. However, a user may want to override the delivery priority designated by the developer or application server to reflect personal preferences for a particular application or to reduce the frequency with which an electronic device is woken up from an inactive or idle state by push notifications. To override the delivery priority designated in a push notification, a user-specified delivery priority may be designated by the user in a registration request sent to a push distribution server to register an application for push notifications. The user-specified delivery priority may reflect a user setting in the application on the electronic device. By default, visible notifications may be delivered to the electronic device immediately upon receipt by the push distribution server, while background notifications may be queued for later delivery. A user may select an option to turn off visible notifications (or treat them the same as background notifications with respect to delivery priority) but continue to allow background notifications. Upon receiving a registration request with a delivery priority designated for the application, the push distribution server updates a priority list associated with the designated delivery priority to include an application identifier associated with the application.

According to aspects of the subject technology, application servers send push notifications intended for an application on an electronic device to a push distribution server. Upon receiving the push notification (block 500), the push distribution server determines whether an application identifier associated with the push notification exists on a priority list containing application identifiers with designated push notification delivery priorities (block 510). If the application identifier is found on the priority list, the delivery priority for the push notification may be changed to a delivery priority associated with the priority list (block 520). After changing the delivery priority (block 520), or if the application identifier is not found on a priority list (block 510), the push notification is delivered to the electronic device according to the designated delivery priority by the push distribution server (block 530).

According to aspects of the subject technology, multiple priority lists for different respective delivery priorities may be maintained by the push distribution server. One of the priority lists may be associated with a delivery priority based on a state of the electronic device to which a push notification is intended to be delivered. For example, push notifications associated with application identifiers found on the priority list may be delivered based on a determination that the electronic device is in an active state. With this delivery priority, the electronic device is not woken from an idle or inactive state by a push notification. Rather, the push notification is delivered upon a determination that the electronic device is currently in an active state. If the application identifier is not found on the priority list, the push notification may be delivered to the electronic device without determining the state of the electronic device.

An active state of an electronic device may include a processor, memory, and peripherals of the electronic device operating to provide an interface with an executing application on the electronic device. An inactive or idle state of an electronic device may include powering down peripherals such as displays and ceasing execution of application instructions by a processor of the electronic device. In the inactive or idle state, the electronic may only perform functions necessary to maintain a current state to which the electronic device will return when returning to an active state.

Determining the state of an electronic device may be based on communications between the electronic device and the push distribution server. For example, an electronic device may be determined to be in an active state for a predetermined period of time following a communication received from the electronic device. The communication may be an acknowledgment from the electronic device confirming receipt of a message from the push distribution server. The predetermined period of time may be a parameter maintained by the push distribution server or may be included in the communication received from the electronic device.

Other delivery priorities may be based on factors besides the state of the electronic device. For example, a delivery priority may limit delivery of the push notification to a particular time or window of time, a particular day or days, a specified geographic location of the electronic device, etc. For example, certain push notifications may be delivered only during business hours Monday through Friday. The conditions for the delivery priority may be maintained as parameters by the push distribution server or may be provided by the application in the registration request.

Figure 6:
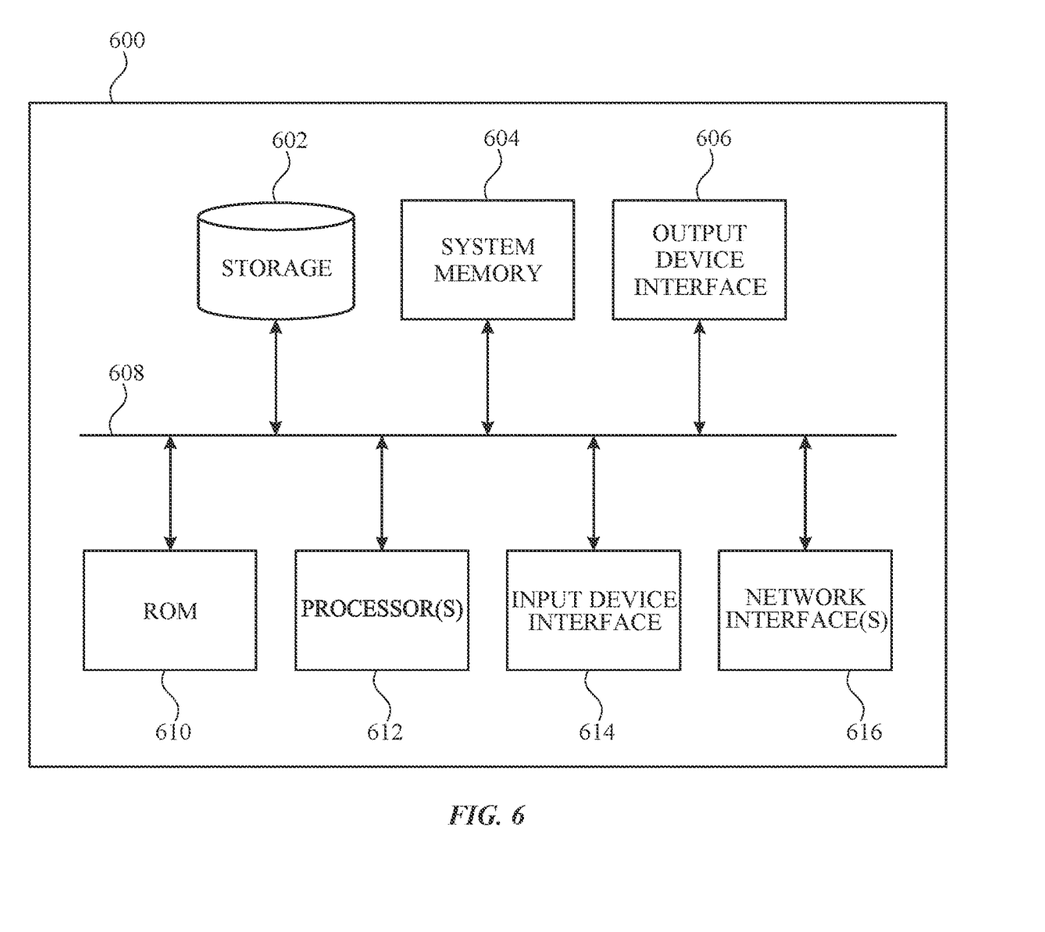
FIG. 6 illustrates an example of a computer system with which aspects of the subject technology may be implemented.

FIG. 6 illustrates an electronic system 600 with which one or more implementations of the subject technology may be implemented. The electronic system 600 can be, and/or can be a part of, server 110 and/or computing device 120 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, such as the computing device 120 shown in FIG. 1, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized as computer program products comprising code in a tangible computer-readable storage medium (or multiple tangible computer-readable storage media of one or more types) encoding one or more instructions of the code. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or segmented in a different way) all without departing from the scope of the subject technology.

Aspects of the present technology may include the gathering and use of data available from specific and legitimate sources for inclusion in push notifications or to manage push notifications. The present disclosure contemplates that in some instances, this gathered data may include personal information data that uniquely identifies or can be used to identify a specific person. Such personal information data can include meta-data or other data associated with images that may include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be communicated to an application on an electronic device for access by a user. Accordingly, use of such personal information data enables users to have greater control of the delivered content. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in connection with push notifications, the present technology can be configured to allow users to select to "opt in" or "opt out" of participation in the collection of personal information data during registration for services or anytime thereafter. In another example, users can select not to provide mood-associated data for use as training data. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, training data can be selected based on aggregated non-personal information data or a bare minimum amount of personal information, such as the content being handled only on the user's device or other non-personal information available to as training data.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving, from a server, a push notification intended for an electronic device, the push notification including a delivery priority;
   determining whether an application identifier of the push notification exists on a priority list containing application identifiers with designated push notification priorities;
   changing the delivery priority included in the push notification from a first priority to a second priority in response to determining that the application identifier exists on the priority list; and
   delivering the push notification to the electronic device according to the second priority.

2. The method of claim 1, further comprising:
   receiving a registration request from the electronic device, wherein the registration request includes a first registration request specific to an application installed on the electronic device; and
   registering the electronic device to receive push notifications from the server based on the registration request.

3. The method of claim 2, wherein the registration request comprises a designated delivery priority, and
   wherein the method further comprises adding the application identifier to the priority list based on the designated delivery priority.

4. The method of claim 1, further comprising:
   determining whether the electronic device is in an active state, wherein the push notification is delivered to the electronic device according to the second priority based on the electronic device being determined to be in the active state.

5. The method of claim 4, wherein determining whether the electronic device is in an active state comprises determining whether a predetermined period of time has lapsed following receiving a communication from the electronic device.

6. The method of claim 4, wherein the electronic device is determined to be in an active state based on a period of time indicated by the electronic device.

7. The method of claim 1, further comprising:
   delivering the push notification to the electronic device according to the first priority in response to determining that the application identifier does not exist on the priority list.

8. The method of claim 7, wherein the first priority is indicated in the push notification received from the server.

9. The method of claim 7, wherein the push notification is delivered to the electronic device according to the first priority without determining a state of the electronic device.

10. The method of claim 7, wherein delivery of the push notification to the electronic device causes the electronic device to transition from an inactive state to an active state.

11. The method of claim 1, wherein the push notification comprises a visible notification for display on the electronic device or a background notification for a background process executed on the electronic device.

12. The method of claim 1, further comprising:
    determining whether the application identifier of the push notification exists on another priority list;
    changing the delivery priority included in the push notification from the first priority to a third priority in response to determining that the application identifier exists on the other priority list; and
    delivering the push notification to the electronic device according to the third priority.

13. The method of claim 12, wherein a timing of delivering the push notification to the electronic device according to the third priority is different from a timing of delivery for the first priority and a timing of delivery for the second priority.

14. The method of claim 1, wherein receiving the push notification intended for the electronic device comprises receiving the push notification at a push distribution server separate from the electronic device, wherein the determining comprises determining whether the application identifier of the push notification exists on the priority list by the push distribution server, wherein changing the delivery priority comprises changing the delivery priority at the push distribution server before delivering the push notification to the electronic device, and delivering the push notification comprises delivering the push notification from the push distribution server to the electronic device according to the second priority.

15. A system, comprising:
a processor; and
a memory device containing instructions which, when executed by the processor, cause the processor to perform a method, comprising:
receiving, from a server, a push notification intended for an electronic device, the push notification including a delivery priority set to a first priority value;
determining whether an application identifier of the push notification exists on a priority list containing application identifiers, the priority list being associated with a second priority value;
changing the delivery priority of the push notification from the first priority value to the second priority value in response to determining that the application identifier exists on the priority list; and
delivering the push notification to the electronic device according to the second priority value.

16. The system of claim 15, wherein the method further comprises:
receiving a registration request from the electronic device, wherein the registration request includes a first registration request specific to an application installed on the electronic device; and
registering the electronic device to receive push notifications from the server based on the registration request.

17. The system of claim 16, wherein the registration request comprises a designated delivery priority, and wherein the method further comprises adding the application identifier to the priority list based on the designated delivery priority.

18. The system of claim 15, wherein the method further comprises delivering the push notification to the electronic device according to the first priority value in response to determining that the application identifier does not exist on the priority list.

19. A computer program product comprising code stored in a non-transitory computer-readable storage medium, the code comprising code for:
receiving, from a server, a push notification intended for an electronic device;
determining whether an application identifier of the push notification exists on a plurality of priority lists containing application identifiers with each of the plurality of priority lists having a respective designated push notification priority value;
changing a delivery priority of the push notification from a first priority value to a second priority value in response to determining that the application identifier exists on one of the plurality of priority lists, the second priority value being the respective designated push notification priority value for the one of the plurality of priority lists; and
delivering the push notification to the electronic device according to the second priority value.

20. The computer program product of claim 19, wherein the code further comprises code for:
determining whether the application identifier of the push notification exists on another priority list of the plurality of priority lists;
changing the delivery priority of the push notification from the first priority value to a third priority value in response to determining that the application identifier exists on the other priority list; and
delivering the push notification to the electronic device according to the third priority value.

21. The computer program product of claim 20, wherein a timing of delivering the push notification to the electronic device according to the third priority value is different from a timing of delivery for the first priority value and a timing of delivery for the second priority value.

22. A server, comprising:
a memory storing a priority list including application identifiers with associated priorities;
one or more processors configured to:
compare an application identifier of a push notification received from a remote device to the application identifiers in the priority list, the push notification having been received from the remote device including a first priority value;
change a delivery priority included in the push notification from the first priority value to a second priority value based on the comparison; and
deliver the push notification to an electronic device according to the second priority value.

23. The server of claim 22, wherein the one or more processors are further configured to:
receive a registration request from the electronic device, wherein the registration request includes a first registration request specific to an application installed on the electronic device; and
register the electronic device to receive push notifications from the remote device based on the registration request.

24. The server of claim 23, wherein the registration request comprises an associated delivery priority, and wherein the one or more processors are further configured to add an application identifier of the application to the priority list based on the associated delivery priority.

25. The server of claim 22, one or more processors are further configured to determine whether the electronic device is in an active state, wherein the push notification is delivered to the electronic device according to the second priority value based on the electronic device being determined to be in the active state.

26. A method, comprising:
comparing an application identifier of a push notification received from a first device to a plurality of priority lists, each respective priority list comprising respective application identifiers and being associated with a respective priority value;
changing a delivery priority included in the push notification from a first priority to a second priority based on the comparison, the second priority being associated with one of the plurality of priority lists that comprises the application identifier; and
delivering the push notification to a second device according to the second priority.

27. A non-transitory machine-readable medium comprising instructions which, when executed by one or more processors, cause the one or more processors to perform operations comprising:
comparing an application identifier of a push notification received from a first device to application identifiers with designated push notification priorities in a priority list;
changing a delivery priority included in the push notification from a first priority value to a second priority value based on the comparison; and delivering the push notification to a second device according to the second priority value.

\* \* \* \* \*

UNITED STATES PATENT AND TRADEMARK OFFICE
CERTIFICATE OF CORRECTION

PATENT NO. : 11,917,030 B2
APPLICATION NO. : 17/214774
DATED : February 27, 2024
INVENTOR(S) : Huan He et al.

It is certified that error appears in the above-identified patent and that said Letters Patent is hereby corrected as shown below:

In the Claims

In Column 20, Line 10 (Claim 22): "associated priorities;" should read --associated priorities; and--.

Signed and Sealed this
Twenty-third Day of April, 2024

Katherine Kelly Vidal
Director of the United States Patent and Trademark Office